United States Patent Office 3,052,502
Patented Sept. 4, 1962

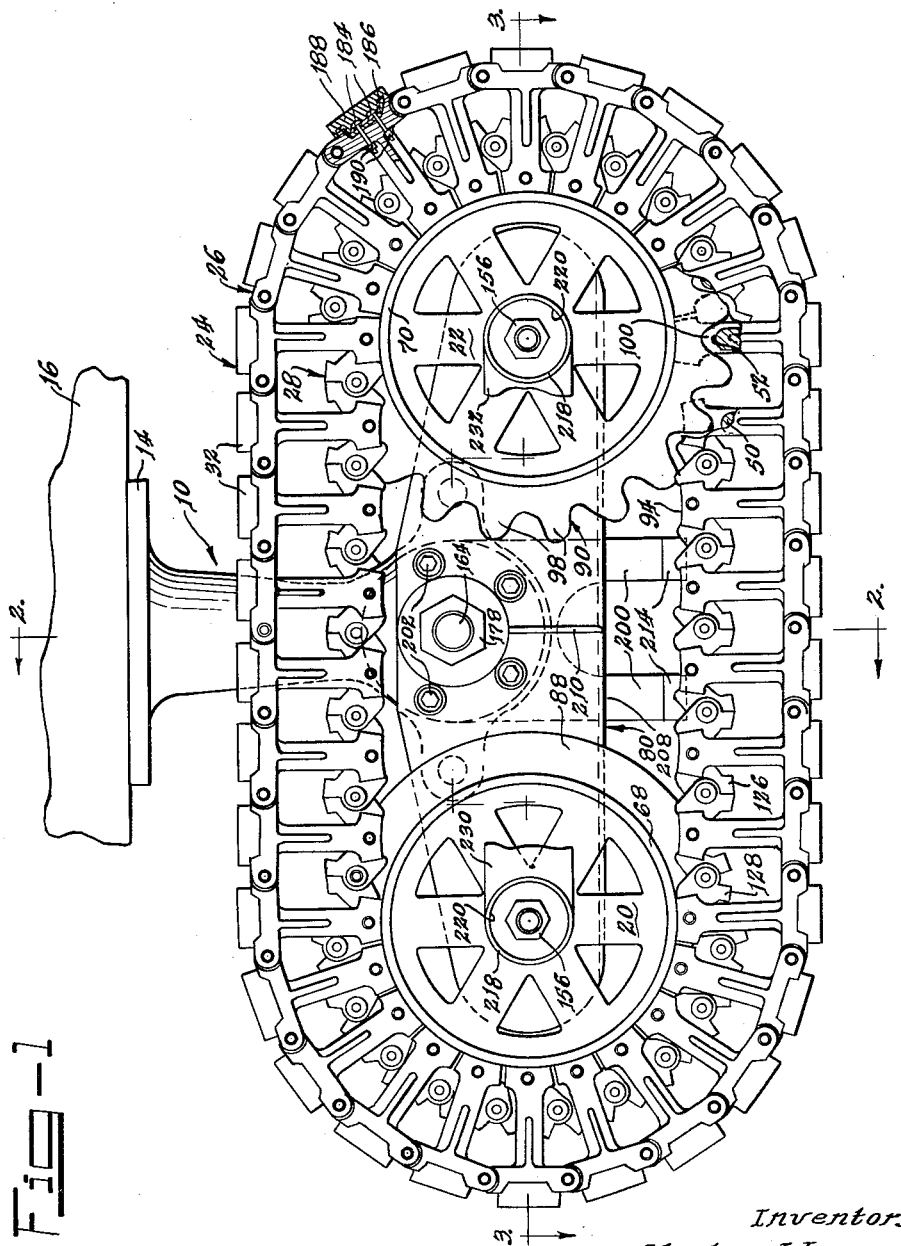

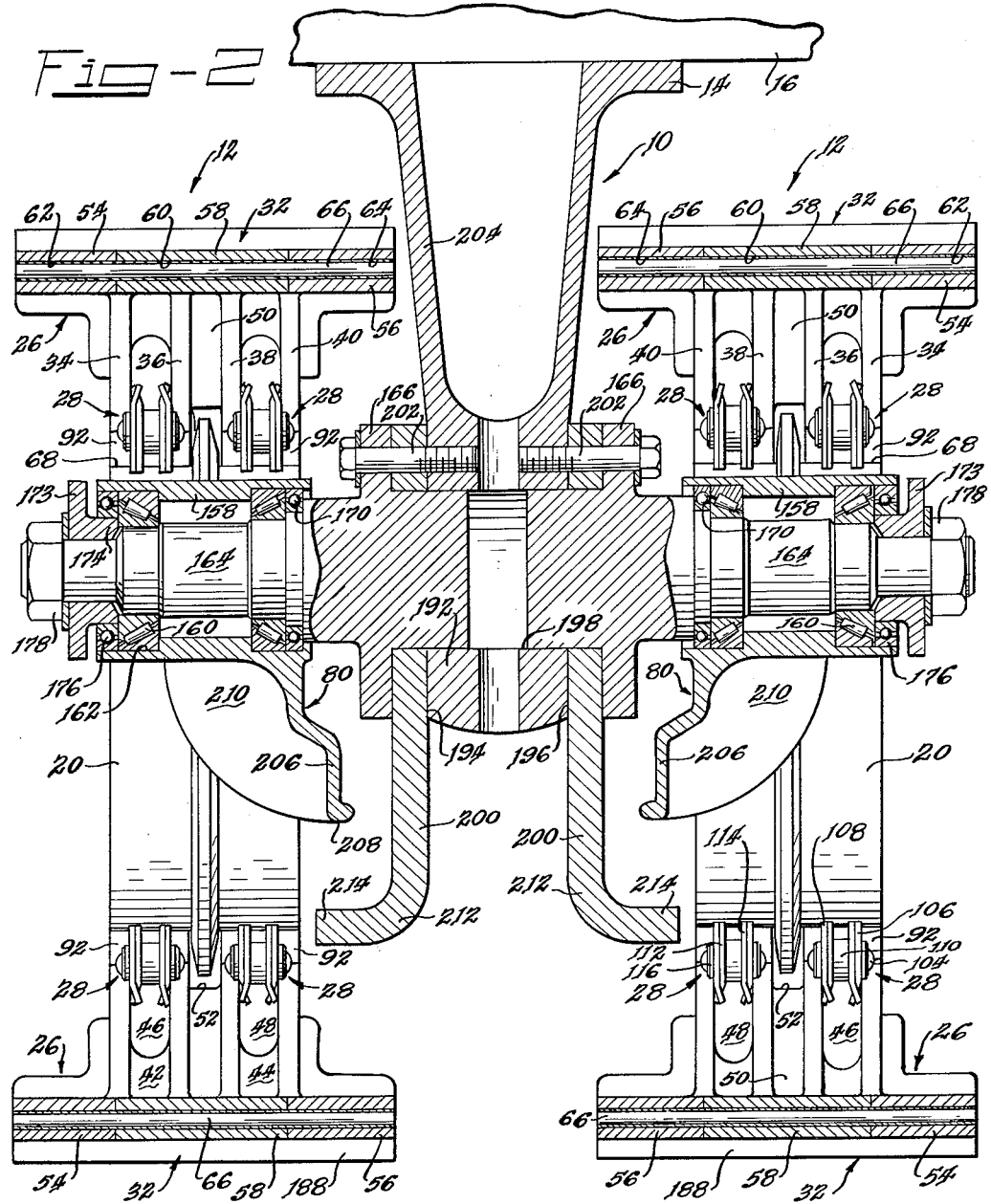

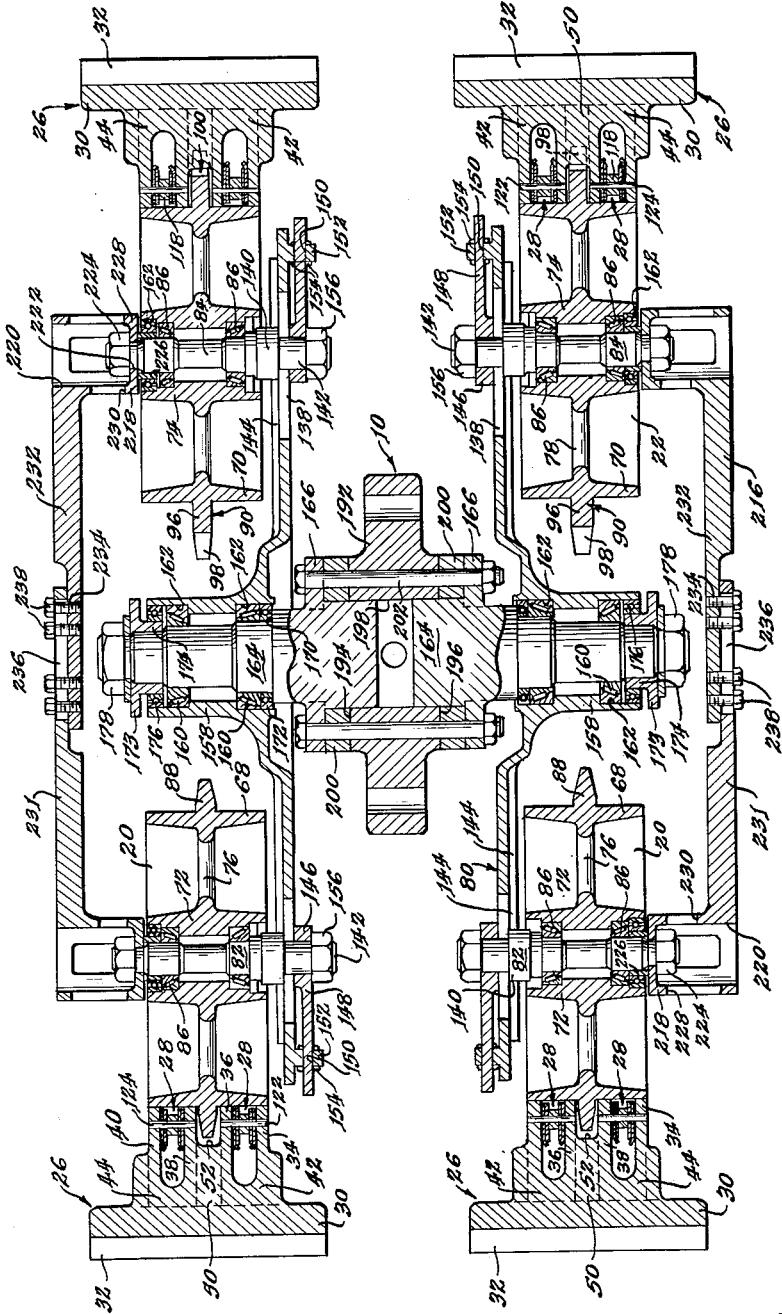

3,052,502
TRACTION WHEEL AND CHAIN
Stephen J. Lucas, Chicago, and Alfred F. Tabron, Worth, Ill., assignors to Lok-Trak, Inc., Chicago, Ill., a corporation of Illinois
Filed Oct. 23, 1959, Ser. No. 848,372
12 Claims. (Cl. 305—49)

The present invention relates generally to means for mounting traction chain and wheel assemblies to a load, and more particularly to dollies for supporting and transporting large bodies such as buildings and the like.

This application is a continuation-in-part of the application of Stephen J. Lucas and Alfred F. Tabron entitled, "Traction Chain and Wheel Assemblies," filed August 6, 1959, Serial No. 832,037. That application discloses traction chain and wheel assemblies for supporting vehicles, and also such assemblies for propelling vehicles. The traction chain and wheel assemblies there disclosed are self-supporting, that is, the traction shoes which are employed in the traction chain are guided and controlled by a hinge chain attached to the traction shoes so that the traction chain is rigid between the wheels of the assembly. It is an object of the present invention to utilize a traction wheel and chain assembly of the type disclosed in the above referred to patent application of the present inventors in a dolly for moving loads.

In the past, dollies have utilized one or more wheels in combination with a frame. Such dollies are utilized for moving both small and large loads, and have found considerable use in moving buildings. When moving a large load with such dollies, a large number of wheels must be provided in order to prevent the pressure exerted upon the surface over which the load is to be moved, such as the surface of a highway, from exceeding the permissible pressures for which the surface has been constructed. It is an object of the present invention to provide a dolly which will be capable of supporting substantially greater loads than the dollies of comparable size heretofore known to the art.

The dollies heretofore known to the art also experience difficulties in moving loads over surfaces which are irregular in any way, that is, it is difficult to move a load over a hilly terrain or a rough and bumpy road. It is therefore a further object of the present invention to provide a dolly utilizing a traction chain and wheel assembly which will be capable of use on irregular surfaces and terrain.

These and further objects of the present invention will become readily apparent to those skilled in the art from a further reading of this disclosure, particularly when viewed in the light of the drawings, in which:

FIGURE 1 is a front elevational view of a dolly constructed according to the teachings of the present invention;

FIGURE 2 is a sectional view taken along the line 2—2 of FIGURE 1; and

FIGURE 3 is a sectional view taken along the line 3—3 of FIGURE 1.

As illustrated in the figures, the dolly comprises a mounting assembly 10 and a pair of traction chain and wheel assemblies 12 mounted on opposite sides of the mounting assembly. The mounting assembly 10 has a support plate 14 which is adapted to engage a load, designated 16. It is to be understood that the load 16 may be a vehicle or a body in transit, such as a building.

FIGURES 1 through 3 illustrate a pair of traction chain and wheel assemblies 12, each having two wheels 20 and 22 mounted in spaced relationship in a common plane, and an endless traction chain 24 mounted about the periphery of the wheels 20 and 22 and translatable with rotation of the wheels. The traction chain 24 is formed by a plurality of interlocked links or traction shoes 26 which are guided and controlled by a pair of hinge chains 28. The traction shoes 26 have a flat plate 30 which supports a pad 32 forming a traction surface. Each traction shoe 26 is provided with four spaced parallel integral posts 34, 36, 38 and 40 which extend normally from the plate 30 in a plane normal to the plane of the track. A supporting web 42 is disposed between the outer posts 34 and 36, and a similar web 44 is disposed between the outer posts 38 and 40, the webs 42 and 44 extending from the plate 30 approximately one-third the length of the posts, thus forming openings 46 and 48 between the posts 34, 36 and 38, 40, respectively, to accommodate the hinge chains 28.

A tooth 50 for engaging the drive wheel 22 is disposed between the posts 36 and 38 and extends from the plate 30 to terminate in a part cylindrical surface 52 spaced from the ends of the posts 36 and 38 opposite the plate 30. Each of the plates 30 has two ears 54 and 56 extending outwardly from opposite ends of one side of the traction shoe, and a single ear 58 extending outwardly from the central portion of the other side of the plate 30. The single ear 58 of one traction shoe 26 is pivotally accommodated between the two ears 54 and 56 of the adjacent traction shoe. The ears 58 are provided with channels 60 which are aligned with channels 62 and 64 in the ears 54 and 56, respectively, to accommodate pins 66 therein. In this manner, the traction shoes 26 and pins 66 form a hinged traction chain.

The wheels 20 and 22 are provided with cylindrical rims 68 and 70, respectively, which are mounted on hubs 72 and 74 by webs 76 and 78, respectively. A mounting plate 80 supports two spindles 82 and 84 in spaced parallel relationship, and the hubs 72 and 74 are journaled about the spindles 82 and 84 on roller bearings 86. Each of the rims 68 and 70 is provided with an outwardly extending guide ring 88 and 90, respectively, which extends from the center of the respective rim. The guide rings 88 and 90 are disposed between the posts 36 and 38 confronting the surface 52 of those traction shoes 26 which are engaged with the wheels 20 and 22.

The ends of each of the posts 34, 36, 38 and 40, designated 92, are identical in shape and protrude outwardly in the plane parallel to the plane of the track. Each of the ends 92 terminates in a surface 94 opposite the plate 30 which is curved on the same radius as the rims 68 and 70 of the wheels 20 and 22. Further, each of the pins 66 passing through the ears of a given traction shoe 26 are located at equal distance on opposite sides of the plane of the posts 34, 36, 38, and 40, and all portions of the posts are located between planes passing through the pins 66 of the given traction shoe and normal to the extension of the surface 94. As a result, the ends 92 of the posts abut the rims 68 and 70 and are accommodated thereabout when passing about the wheels 20 and 22.

The guide ring 88 of the wheel 20 extends from the rim 68 a distance less than the shortest distance from the surface 94 of the traction shoes 26 to the surface 52 thereof. As a result, the guide ring 88 merely maintains the traction chain 24 in alignment with the wheel 20. The guide ring 90 of the wheel 22, however, has two portions. The first portion 96 is a solid ring portion which extends from the rim 70 a distance less than the shortest distance from the surface 94 to the surface 52 of the traction shoes 26 so that it, like the guide ring 88, serves to maintain the traction shoes in alignment with the wheel 22. The guide ring 90, however, has a tooth portion 98 extending outwardly from the ring portion 96 to form a sprocket for the wheel 22. The tooth portion 98 extends a distance further than the shortest distance between the surface 94 and the surface 52 of the traction shoes 26, and the individual teeth of the portion 98 extend on opposite sides of the surface 52 of each of the traction shoes 26 disposed about the wheel 22. It is important to note that the ring portion 96 of the guide ring 90 does not engage the surface 52 of the tooth portion 50 of the traction shoes 26, but is spaced therefrom by a gap 100. This construction is best illustrated in FIGURES 1 and 3.

The gap 100 between the surface 52 of the traction shoes 26 and the guide portion 96 of the guide ring 90 of the wheel 22 is sufficient to permit the traction shoes 26 to pass around the rim 70 without contact except for the surfaces 94 at the ends 92 of the posts, thus reducing wear and limiting contact between the traction shoes 26 and the wheel 22 in normal operation to the abutting surfaces 94 of the traction shoes 26 and the rim 70. FIGURE 1 illustrates the gap 100 for one traction shoe 26 located with its posts on the radius of the wheel 22 normal to the path of the approaching track, and also the position of the surface 52 relative to the sprocket for the adjacent traction shoe 26 approaching the wheel 22. Also, FIGURE 1 illustrates the gap 100 of one traction shoe which has approximately 6 degrees to travel prior to the point of embarkation from the wheel 22 and the immediately preceding traction shoe which has now become aligned with the track. It is to be noted that there are eleven traction shoes 26 in abutment with each of the wheels 20 and 22 in the particular construction disclosed, and hence each of the traction shoes is separated by an arc of approximately 18 degrees about the wheels 20 and 22.

It is clear from FIGURE 1 that the sprocket or toothed portion 98 of the guide ring 90 does not in normal operation engage the teeth 50 of the traction chain 24. It is only when the traction chain 24 is jerked or encounters a bump that the sprocket engages the teeth 50 of the traction chain, and then after a revolution or two, the teeth 50 of the traction chain become realigned with the teeth of the sprocket to eliminate contact.

As stated above, each traction chain 24 is controlled and guided by two identical hinge chains 28 which are disposed between the legs 34, 36, and 38, 40 of the traction shoes 26, as best illustrated in FIGURES 2 and 3. Each chain 28 employs a plurality of pins 104 each of which journals two links 106 and 108 at opposite ends thereof. A hollow cylindrical spacer 110 is disposed between the links 106 and 108, and two additional links 112 and 114 are disposed between each spacer 110 and the adjacent links 106 and 108, respectively. The ends of the pins 104 are swaged, and a washer 116 is disposed between the ends of each pin and the links 106 and 108.

The links 106 and 108 journaled to each pin are also journaled about a hollow cylindrical sleeve 118 disposed on an axis spaced and parallel to the axis of the pin 104. Each of the sleeves 118 is provided with a hollow cylindrical spacer 110, and links 112 and 114 are journaled about the sleeve between the spacer 110 and the links 106 and 108, respectively. In other words, each of the links 106 and 108 is journaled about a sleeve 118 and a pin 104, and the links 112 and 114 journaled about that pin 104 are also journaled about a different sleeve 118.

Each of the posts 34, 36, 38 and 40 of the traction shoes 26 is provided with a bore 122, and the bores 122 are disposed on a common axis normal to the posts 34, 36, 38 and 40. A pin 124 extends through the bore 122 of the posts 34 and 36 of each traction shoe 26 and through one of the sleeves 118 of one of the chains 28. In like manner, a pin 124 is disposed through each of the bores 122 in the posts 38 and 40 of each traction shoe 26 and through the intervening sleeve 118 of the chain 28 between the posts 38 and 40. The pins 124 are anchored to the posts 34, 36, 38 and 40, and the sleeves 118 are attached to the hinge chain 28. As a result of this construction, the chains 28 are completely fabricated independent of the traction shoes 26, and in assemblying the traction chain and wheel assembly, it is only necessary to place the completed chains 28 between the posts 34, 36, 38 and 40 of the traction shoes 26 and place the pins 124 in position. It is not necessary to assemble the chains 28 into the traction shoes 26.

Each of the links 106 and 108 is provided with a stop lug on the side thereof adjacent one of the pins 104, the stop lugs being designated 126 and being bent inwardly relative to the axis of the chain 28. In like manner, each of the links 112 and 114 is provided with a stop lug 128 on the side thereof adjacent to one of the pins 104, and the stop lugs 128 are bent outwardly relative to the axis of the chain to abut the stop lugs 126 of the links 106 and 108. The stop lugs 126 and 128 are disposed on the side of the chains 28 confronting the traction shoes 26, and are arranged to abut each other to maintain the pins 104 outwardly from the pins 124 relative to the axis of the traction chain and wheel assembly. As a result of this construction, the track is permitted to bend around the wheels 20 and 22, but may not bend in the reverse direction beyond a straight line. Also, each of the links 106, 108, 112, and 114 is provided with a flat side 132 adjacent the lug thereof, and a projecting portion 130 on the side thereof opposite the flat side. Each projecting portion terminates in a surface forming an obtuse angle with the flat side 132, and the projecting portions 10 of the links abut the rims 68 and 70 of the wheels 20 and 22 to control opening and closing of the track.

The spindles 82 and 84 of each assembly 12 are adjustably mounted to the mounting plate 80 of that assembly so that the distance between the spindles is adjustable over a range. Since each of the adjustable mounting means for each assembly is identical, only one will be described. The spindle 82 or 84 extends through a slot 138 in the mounting plate 80. The slot 138 is parallel to the straight portions of the track, and the slots for the two spindles 82 and 84 are aligned. Each of the spindles 82 and 84 has an outwardly extending flange 140 which abuts the side of the mounting plate confronting the traction chain 24 and wheels 20 and 22. Each spindle is also provided with a cylindrical shank 142 which extends through the slot 138. A pair of parallel outwardly extending walls 144 are disposed on each side of the slot 138 and spaced therefrom, and the flange 140 is provided with flat surfaces which engage the walls 144 to prevent the spindle from rotating. An eyelet 146 is disposed about the shank 142 of the spindle on the side of the mounting plate 80 opposite the traction chain 24, and the eyelet is provided with a threaded shaft 148 which extends parallel to the mounting plate 80 in the opposite direction from the other spindle. The shaft 148 extends through an opening 150 in a protruding anchor 152 disposed on the surface of the mounting plate opposite the traction chain 24, and the shaft is securely held in position by a pair of lock nuts 154 when the spindle is properly positioned. A lock nut 156 threadedly engaged to the shank 142 of the spindle is tightened upon the eyelet 146 and locked in place to secure the spindle in the proper position.

Approximately equidistant between the spindles 82 and 84 of each assembly 12 is a hub 158 which is integral with the mounting plate 80 of that assembly and extends inwardly therefrom between the spindles. Each hub 158 is provided with two roller bearing assemblies 160 mounted in indentations 162 at opposite ends of the hub 158. A drive shaft 164 is journaled within the roller bearing assemblies 160 of each assembly and supports a mounting flange 166 at its end adjacent to the mounting plate 80. Each drive shaft 164 is provided with a shoulder 170 confronting the roller bearing assembly 160 contiguous to the flange 166, and a sealing ring 172 is disposed between the shoulder 170 and the roller bearing assembly 160. In like manner, a circular bushing 173 is disposed about the end of each shaft 164 opposite the flange 166, and the bushing 173 is provided with an outwardly extending sleeve 174 which extends within the hub 158. A sealing ring 176 is disposed between the hub 158 and the sleeve 174. The end of each drive shaft 164 opposite the mounting flange 166 engages the threads of a lock nut 178 which maintains the shoulder 170 in contact with the sealing ring 172 and also maintains the sleeve 174 of the bushing 173 in abutment with the roller bearing assembly 160 in the recess 162.

As indicated in FIGURE 1, the pads 32 are secured to the traction shoes 26 by bolts 184. These pads may be constructed of many different suitable materials, such as iron or rubber. FIGURE 1 illustrates a preferred construction for a rubber pad 30 in that it contains a plate 186 having the shape of the exterior surface of the plate 30 embedded in a layer 188 of rubber. The bolts 184 extend from the plate 186 through the plate 30 of the traction shoe 26, and are locked in position by nuts 190. A rubber shoe of this type may be readily employed for use on pavements since it will not mar the pavement, and the traction chain and wheel assembly will spread the load of the vehicle or other device over a wide area of the surface.

As illustrated in FIGURES 2 and 3, two such traction chain and wheel assemblies 12 are mounted to the mounting assembly 10. The mounting assembly 10 has a circular hub 192 with parallel flat surfaces 194 and 196. A cylindrical aperture 198 extends centrally through the hub 192 normal to the surfaces 194 and 196, and the ends of the shafts 164 of the two traction chain and wheel assemblies 12 are accommodated within the aperture 198, the two shafts 164 terminating at a distance from each other. A flotation plate 200 is disposed between the flange 166 of each traction chain and wheel assembly 12 and the hub 192 of the mounting assembly 10, and each of the traction chain and wheel assemblies 12 is secured to the hub 192 by bolts 202 which extend through the flanges 166 and hub 192. In this manner, the shaft 164 of each of the traction chain and wheel assemblies is secured to the hub 192 of the mounting assembly. The mounting assembly is provided with a tubular portion 204 which extends from the hub 192 thereof to the mounting plate 14 and which transmits the load carried by the mounting plate 14 to the shafts 164 of the two traction chain and wheel assemblies 12.

The mounting plates 80 of each of the traction chain and wheel assemblies 12 are provided with a depending skirt 206 which extends on the opposite side of the shaft thereof from the mounting plate 14. The skirts 206 terminate in a straight surface 208 which is generally parallel to the surface upon which the dolly is operating. A supporting web 210 extends between the skirt 206 and the hub 158 for the shaft 164 of each of the traction chain and wheel assemblies 12. Each flotation plate 200 has bifurcated portions 212 confronting the skirts 206, and two spaced legs 214 extend from the flotation plate parallel to the shaft 164 of each of the traction chain and wheel assemblies to confront the straight edge 208 of the skirt 206 of the mounting plate 80 of that assembly. The legs 214 will thus abut the straight edge 208 of the skirt 206 in the event that the traction chain and wheel assembly 12 thereof is pivoted about the axis 164 sufficiently.

It is to be noted that the shaft 164 of the two traction chain and wheel assemblies 12 are disposed above the plane of the spindles 82 and 84, and that therefore the dolly is adapted to maintain its load at a higher level from the surface than it would were the shafts 164 disposed in the plane of the axis of the spindles 82 and 84. Further, it is to be noted that each of the traction chain and wheel assemblies 12 is free to pivot about its respective shaft 164 independently, that is, should the terrain require the one traction chain and wheel assembly 12 to pivot in a clockwise direction, the other traction chain and wheel assembly may pivot in a counterclockwise direction about its shaft 164 simultaneously. Further, since the traction chains are rigid with respect to the surface upon which they are operating, they have the effect of minimizing the amount of pivoting required, and also of averaging the vertical deflection resulting from differences in the terrain because of the fact that the assemblies 12 are each pivoted centrally between the two wheels 20 and 22 thereof.

It is to be noted that each assembly 12 has a torsion bar 216 extending between the ends of the spindles 82 and 84 opposite the mounting plate 80. The torsion bar 216 is for the purpose of strengthening the mounting for the spindles and preventing vibration or wobble of the spindles. At each end of the torsion bar 216 is a protruding portion 218 which has a cylindrical recess 220 extending therein and an axial opening 222 which is accommodated about the end of the spindles 82 or 84. A lock nut 224 is threaded upon the end of the spindle, and secures the torsion bar against a ring 226 disposed about the spindle and secures the roller bearing assembly 86 in position. The protruding portion 218 of the torsion bar 216 is also provided with openings 228 and 230 to facilitate tightening of the lock nut 224.

The torsion bar 216 is constructed of two sections 231 and 232 which are joined at the center of the torsion bar. The section 232 is provided with a number of threaded bores 234, which extend therethrough, and are aligned with the torsion bar, and the portion 231 is provided with an elongated slot 236 which is aligned with the bores 234. Lock bolts 238 extend through the slot 236 to engage each of the threaded bores 234 to secure the two portions 231 and 232 of the torsion bar 216 together.

From the foregoing disclosure, those skilled in the art will readily devise many modifications of the invention set forth. Further, it is believed to be clearly within the skill of the art to utilize the present invention for analogous devices. It is therefore intended that the scope of the invention be not limited by the foregoing disclosure, but rather only by the appended claims.

The invention claimed is:

1. A device for carrying a load comprising, in combination: a pair of traction chain and wheel assemblies, each assembly having first and second spaced wheels disposed for rotation in a common plane and having cylindrical rims coaxially disposed on each of the wheels and a guide ring extending outwardly from each rim in the plane of the whels, an endless chain of traction shoes disposed about the wheels, each of said traction shoes having a plate with hinge ears on opposite sides thereof and the hinge ears of each plate being meshed with the hinge ears of the plates of adjacent shoes and coupled by pins extending through the meshed hinge ears, each traction shoe having a pair of spaced posts extending normally from the plate of the traction shoe and terminating on the end opposite the plate in a concave surface with a radius of curvature equal to the radius of the outer surface of the rims of the wheels, each traction shoe having a tooth extending between the posts thereof from the plate and terminating in a surface spaced from the ends of the posts by a distance greater than the distance the guide rings of the wheels extend from the rims of the wheels, the teeth of the traction shoes being disposed in the same plane as the guide rings of the wheels, a plurality of spaced sprocket teeth extending radially outward from at least one of the guide rings, said teeth confronting the teeth of the traction shoes engaging the wheel and being intermeshed with the teeth of the traction shoes, a mounting plate having a pair of parallel spaced spindles extending from one side of the plate, the first wheel being journaled on one of the spindles and the second wheel being journaled on the other spindle, said mounting plate having a hub extending from the plate between the spindles; a shaft journaled within the hub of each assembly having an outwardly extending flange and a cylindrical end portion extending outwardly from the flange; and a support structure having a hub with parallel flat surfaces and a cylindrical opening extending therethrough normal to the flat surfaces, the flange of one of the shafts being mounted on one of the flat surfaces and the cylindrical portion of said shaft being disposed within the opening of the hub of the support structure, and the flange of the other shaft being mounted on the other flat surface of the hub and the cylindrical portion of said shaft being disposed within the opening, said support structure also having a support plate for carrying a load and structural means extending between the flange and the support plate for positioning the support plate on the exterior side of the traction chains.

2. A device for carrying a load comprising the elements of claim 1 wherein each of the traction shoes is provided with two additional posts extending from the plate of the traction shoe parallel and in the same plane with the other two posts, said additional posts being on opposite sides of the other posts and spaced therefrom, an endless hinge chain disposed between each of the additional posts and the confronting other posts, said chains having a hinge joint journaled about a pin mounted between and normal to the additional post and confronting post of each traction shoe and a hinge joint located between successive traction shoes.

3. A device for carrying a load comprising the elements of claim 2 wherein each of the hinge joints located between successive traction shoes is provided with stop means for limiting the opening of the joint so that the maximum length of the hinge chain between posts equals the distance between posts of adjacent traction shoes when parallel.

4. A device for carrying a load comprising the elements of claim 1 wherein the mounting plate of each of the traction chain and wheel assemblies is provided with a straight edge parallel to the plane of the spindles of the assembly, and the support structure is provided with two members confronting said straight edge of each assembly, each of said members being located on a plane normal to the plane of the spindles and between the hub of the assembly and one of the spindles of the assembly, thereby limiting clockwise and counterclockwise rotation of each of the assemblies about the shafts.

5. A device for carrying a load comprising, in combination: a pair of traction chain and wheel assemblies, each assembly having first and second spaced wheels disposed for rotation in a common plane and having cylindrical rims coaxially disposed on each of the wheels and a guide ring extending outwardly from each rim in the plane of the wheels, an endless chain of traction shoes disposed about the wheels, each of said traction shoes having a plate with hinge ears on opposite sides thereof and the hinge ear of each plate being meshed with the hinge ears of the plates of adjacent shoes and coupled by pins extending through the meshed hinge ears, each traction shoe having a pair of spaced posts extending normally from the plate of the traction shoe and terminating on the end opposite the plate in a concave surface with a radius of curvature equal to the radius of the outer surface of the rims of the wheels, each traction shoe having a tooth extending between the posts thereof from the plate and terminating in a surface spaced from the ends of the posts by a distance greater than the distance the guide rings of the wheels extend from the rims of the wheels, the teeth of the traction shoes being disposed in the same plane as the guide rings of the wheels, a plurality of spaced sprocket teeth extending radially outward from at least one of the guide rings, each sprocket tooth being disposed between the teeth of adjacent traction shoes engaging the wheel, a mounting plate having a pair of parallel spaced spindles extending from one side of the plate, the first wheel being journaled on one of the spindles and the second wheel being journaled on the other spindle, said mounting plate having a hub extending from the plate between the spindles; a shaft journaled within the hub of each assembly having an outwardly extending flange and a cylindrical end portion extending outwardly from the flange; and a support structure having a hub with parallel flat surfaces and cylindrical opening extending therethrough normal to the flat surfaces, the flange of one of the shafts being mounted on one of the flat surfaces and the cylindrical portion of said shaft being disposed within the opening of the hub of the support structure, and the flange of the other shaft being mounted on the other flat surface of the hub and the cylindrical portion of said shaft being disposed within the opening, said support structure having a tubular portion extending from the hub beyond the remote surface of the traction shoes of each assembly and terminating in a plate perpendicular to the axis of the tubular portion adapted to carry a load, said support means having a flotation plate mounted on each of the flat surfaces of the hub thereof and extending from the hub in the opposite direction from the tubular portion, each of said flotation plates being bifurcated and having two portions extending therefrom normal to the axis of the tubular portion, each of said portions being disposed on each side of a plane normal to the flotation plate and coincident with the axis of the tubular portion, said portions extending parallel to the shaft journaled to the confronting assembly a distance greater than the spacing of the mounting plate of said assembly from said flotation plate of the mounting structure to confront an edge of the mounting plate and form rotational stops for the assembly.

6. A dolly for carrying a load, comprising, in combination: a pair of traction chain and wheel assemblies each assembly having first and second spaced wheels disposed for rotation in a common plane and having cylindrical rims coaxially disposed on each of the wheels and a guide ring extending outwardly from each rim in the plane of the wheels, an endless chain of traction shoes disposed about the wheels, each of said traction shoes having a plate with hinge ears on opposite sides thereof and the hinge ears of each plate being meshed with the hinge ears of the plates of adjacent shoes and coupled by pins extending through the meshed hinge ears, each traction shoe having a post extending normally from the plate of the traction shoe and terminating on the end opposite the plate in a concave surface with a radius of curvature equal to the radius of the outer surface of the rims of the wheels, each traction shoe being provided with a second post extending from the plate of the traction shoe parallel and in the same plane with the first post, an endless hinge chain disposed between the first and second posts, said chain having a hinge joint journaled about a pin mounted between the first and second posts and a second hinge joint located between successive traction shoes, said second hinge joints being provided with stop means for limiting the opening of the joint so that the maximum length of the hinge chain between posts equals the distance between posts of adjacent traction shoes when parallel, a mounting plate having a pair of parallel spaced spindles extending from one side of the plate, the first wheel being journaled on one of the spindles and the second wheel being journaled on the other spindle, said mounting plate having a hub disposed between the spindles; a shaft journaled within the hub of each of the assemblies; and means mounted on the shafts for mounting the shafts on a common axis, said means being adapted to carry a load.

7. A dolly for carrying a load comprising the elements of claim 6 wherein the hub of each of the traction chain and wheel assemblies is disposed equidistant from the spindles.

8. A dolly for carrying a load comprising the elements of claim 7 wherein the hub of each of the traction chain and wheel assemblies is disposed on an axis displaced from the plane of the spindles of said assembly.

9. A traction chain and wheel assembly comprising the elements of claim 6 in combination with a bar mounted at one end to the end of the first spindle opposite the mounting plate of one of the assemblies and mounted at the other end to the end of the other spindle of said assembly opposite the mounting plate.

10. A device for carrying a load comprising, in combination: a pair of traction chain and wheel assemblies, each assembly having first and second spaced wheels disposed for rotation in a common plane, an endless chain of traction shoes disposed about the wheels, a mounting plate having a pair of parallel spaced spindles extending from one side of the plate, the first wheel being journaled on one of the spindles and the second wheel being journaled on the other spindle, said mounting plate having a hub extending from the plate between the spindles; a shaft journaled within the hub of each assembly having an outwardly extending flange and a cylindrical end portion extending outwardly from the flange; and a support structure having a hub with parallel flat surfaces and a cylindrical opening extending therethrough normal to the flat surfaces, the flange of one of the shafts being mounted on one of the flat surfaces of the hub of the support structure and the cylindrical portion of said shaft being disposed within the opening of the hub of the support structure, and the flange of the other shaft being mounted on the other flat surface of the hub of the support structure and the cylindrical portion of said shaft being disposed within the opening, said support structure also having a support plate for carrying a load and structural means extending between the hub of the support structure and the support plate for positioning the support plate on the exterior side of the traction chains.

11. A device for carrying a load comprising, in combination: a pair of traction chain and wheel assemblies, each assembly having first and second spaced wheels disposed for rotation in a common plane, an endless chain of traction shoes disposed about the wheels, a mounting plate having a pair of parallel spaced spindles extending from one side of the plate and a hub for receiving a shaft, the first wheel being journaled on one of the spindles and the second wheel being journaled on the other spindle; and a support structure having a shaft journaled within the hub of the traction chain and wheel assemblies to rotatably mount the mounting plates of the traction chain and wheel assemblies on the shaft in parallel relationship with each other, said support structure also having a support plate for carrying a load and structural means extending between the shaft and the support plate.

12. A device for carrying a load comprising the elements of claim 11 wherein the wheels of each traction chain and wheel assembly are provided with cylindrical rims and a guide ring extending outwardly from each rim in the plane of the wheels, and the traction shoes of the endless chain of traction shoes are provided with a pair of spaced posts which abut the cylindrical rims of the wheels and accommodate the guide rings of the wheels therebetween.

References Cited in the file of this patent

UNITED STATES PATENTS

| | | |
|---|---|---|
| 1,687,834 | Frederickson | Oct. 16, 1928 |
| 1,812,875 | Henneuse | July 7, 1931 |
| 1,991,502 | Henneuse | Feb. 19, 1935 |
| 2,053,088 | Kuchar | Sept. 1, 1936 |
| 2,383,184 | Frederickson | Aug. 21, 1945 |
| 2,385,923 | Klaucke et al. | Oct. 2, 1945 |